US006386448B1

(12) United States Patent
Addy

(10) Patent No.: US 6,386,448 B1
(45) Date of Patent: May 14, 2002

(54) METHOD AND APPARATUS FOR OPERATING A SELF-SERVICE RETAIL SYSTEM IN A DEPARTMENT STORE

(75) Inventor: John C. Addy, Lawrenceville, GA (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/343,060

(22) Filed: Jun. 29, 1999

(51) Int. Cl.[7] .............................................. G06K 15/00
(52) U.S. Cl. ........................ 235/383; 235/378; 235/381
(58) Field of Search ................................ 235/383, 385, 235/378, 462.45, 462.46, 472.01, 472.02, 381; 705/14, 16, 17, 21, 23

(56) References Cited

U.S. PATENT DOCUMENTS 4,779,706 A 10/1988 Mergenthaler
4,909,356 A * 3/1990 Rimondi et al. ............ 235/383
4,929,819 A 5/1990 Collins, Jr.
5,361,871 A * 11/1994 Gupta et al. ................ 235/383
5,378,860 A 1/1995 Dingfelder
5,397,882 A * 3/1995 Van Solt ..................... 235/383
5,406,271 A * 4/1995 Sonnendorfer et al. 340/825.35
5,412,191 A 5/1995 Baitz et al.
5,494,136 A 2/1996 Humble
5,594,228 A * 1/1997 Swartz et al. ............... 235/383
5,595,264 A * 1/1997 Trotta, Jr. ................... 235/383
5,710,416 A 1/1998 Belknap et al.
5,804,807 A * 9/1998 Murrah et al. .............. 235/472
5,918,211 A * 6/1999 Sloane ........................ 705/16
6,129,274 A * 10/2000 Suzuki ....................... 235/381
6,189,789 B1 * 2/2001 Levine et al. ............... 235/383

FOREIGN PATENT DOCUMENTS

EP 0301451 * 2/1989 ................. 235/383
JP 0191066 * 11/1983 ................. 235/383

* cited by examiner

*Primary Examiner*—Michael G. Lee
*Assistant Examiner*—Daniel St. Cyr
(74) *Attorney, Agent, or Firm*—Maginot, Addison & Moore LLP

(57) ABSTRACT

A method of operating a department store retail system in order to perform a purchase transaction, with the department store retail system has a first self-service checkout terminal positioned in a first department of the department store and a supervisor terminal, includes the step of generating a first item-entered control signal if a customer enters a first item for purchase from the first department in the first self-service checkout terminal. The method also includes the step of determining if the customer has an additional item for purchase from the first department to enter in the first self-service checkout terminal in response to generation of the first item-entered control signal and generating a first no-additional-items control signal if the customer has no additional items from the first department to enter in the first self-service checkout terminal. The method further includes the step of suspending the purchase transaction of the customer at the first self-service checkout terminal in response to generation of the first no-additional-items control signal. A department store retail system is also disclosed.

36 Claims, 5 Drawing Sheets

METHOD AND APPARATUS FOR OPERATING A SELF-SERVICE RETAIL SYSTEM IN A DEPARTMENT STORE

TECHNICAL FIELD OF THE INVENTION

The present invention relates generally to a retail system, and more particularly to a method and apparatus for operating a self-service retail system in a department store.

BACKGROUND OF THE INVENTION

A self-service checkout retail terminal is a system which is operated by a customer without the aid of a checkout clerk. What is meant herein by the term "customer" is a person who enters the retailer's store, selects his or her items for purchase from a shopping area of the store, checks out his or items for purchase, tenders payment for his or her items for purchase, and then exits the store subsequent to tendering payment. Hence, as used herein, a customer is distinguished from a retail checkout clerk or other employee of the retailer in that a customer enters the retailer's store for the sole purpose of purchasing items from the store. In regard to operation of a self-service checkout terminal, the customer scans individual items for purchase with a scanner or otherwise enters the item and then places the entered item into a shopping bag, if desired. The customer then pays for his or her purchase either at the self-service checkout terminal if so equipped, or at a central payment area such as a remote supervisor terminal or payment terminal which is staffed by a store employee. Thus, a self-service checkout terminal permits a customer to select, itemize, and in some cases pay for his or her items for purchase without the assistance of the retailer's personnel.

However, self-service checkout terminal concepts have heretofore been designed as high speed, high volume, "centralized", "front-end" checkout terminals that are most applicable to food retailers such as grocery stores and supermarkets. Such heretofore self-service checkout terminals would be difficult, if not impossible, to implement in a department store where the checkout process is generally low speed, low volume, and "decentralized".

For example, heretofore designed self-service checkout terminals provide security by use of a "scan and bag" concept in which every item purchased can be scanned and thereafter placed in a "post-scan bagging area" with one motion such that a security scale located within the post-scan area may be utilized to detect presence of each of the items thereby ensuring that only proper items (i.e. items that have been entered in the terminal) are placed in the post-scan bagging area.

In addition, self-service checkout terminal concepts have typically heretofore been designed to include devices for handling cash. For example, heretofore designed self-service checkout terminals typically include cash acceptors for accepting cash from a customer and cash dispensers for dispensing change or "cash back". However, due to a larger average item price, cash is not the typical manner in which customers tender payment for items in a department store, and the providing of "cash back" is typically not a service offered by most department stores.

Moreover, in a grocery store, checkout transactions are typically performed in a centralized area. For example, in a grocery store, a number of checkout terminals are typically located at the front of the store near the doors leading into and out of the store. However, in a department store, items are typically purchased, bagged, and in some cases gift wrapped in the department in which the goods are located. In such a situation, the customer may be assisted by numerous checkout clerks in numerous departments in order to conduct numerous different checkout transactions during a single visit to the department store.

In addition, self-service checkout terminals which have heretofore been designed typically include a scanner having a product scale integrated or otherwise associated therewith. The product scale is provided to weigh items such as produce items which are generally sold according to the weight of the item. The integrated scanner is typically flush mounted to a counter or the like associated with the self-service checkout terminal such that grocery items can be passed over the scanner in order to have the bar code associated with the item read by the scanner. However, such a configuration is not needed in a department store. Firstly, a department store typically does not include items which are sold by weight thereby eliminating the need for a product scale. Moreover, items such as clothing items which are sold in a department store generally have a bar code or the like printed on a tag which is hanging from or otherwise secured to the item. Hence, such tagged items are typically scanned by a scanning motion in which the sales clerk grabs the tag and presents the tag to a stationary or hand-held scanner.

What is needed therefore is a self-service retail system which overcomes one or more of the above-mentioned drawbacks. What is particularly needed is a method and apparatus for operating a retail system which allows for the performance of a self-service checkout transaction in a department store.

SUMMARY OF THE INVENTION

In accordance with a first embodiment of the present invention, there is provided a method of operating a department store retail system in order to perform a purchase transaction. The department store retail system has a first self-service checkout terminal positioned in a first department of the department store and a supervisor terminal. The method includes the step of generating a first item-entered control signal if a customer enters a first item for purchase from the first department in the first self-service checkout terminal. The method also includes the step of determining if the customer has an additional item for purchase from the first department to enter in the first self-service checkout terminal in response to generation of the first item-entered control signal and generating a first no-additional-items control signal if the customer has no additional items from the first department to enter in the first self-service checkout terminal. The method further includes the step of suspending the purchase transaction of the customer at the first self-service checkout terminal in response to generation of the first no-additional-items control signal.

In accordance with a second embodiment of the present invention, there is provided a method of operating a department store retail system in order to perform a purchase transaction. The department store retail system has a first self-service checkout terminal positioned in a first department of the department store and a second self-service checkout terminal positioned in a second department of the department store. The method includes the step of generating a first item-entered control signal if a customer enters a first item for purchase from the first department in the first self-service checkout terminal. The method also includes the step of determining if the customer has an additional item for purchase from the first department to enter in the first self-service checkout terminal in response to generation of the first item-entered control signal and generating a first no-additional-items control signal if the customer has no additional items from the first department to enter in the first self-service checkout terminal. The method further includes the step of suspending the purchase transaction of the customer at the first self-service checkout terminal in response to generation of the first no-additional-items control signal. Moreover, the method includes the step of resuming the purchase transaction of the customer at the second self-service checkout terminal, wherein the resuming step is performed subsequent to the suspending step. Yet further, the method includes the step of generating a second item-entered control signal if the customer enters a second item for purchase from the second department in the second self-service checkout terminal.

In accordance with a third embodiment of the present invention, there is provided a method of operating a department store retail system in order to perform a purchase transaction. The department store retail system has a self-service checkout terminal positioned in a department of the department store and a supervisor terminal positioned in an exit area of the department store. The method includes the step of generating an item-entered control signal if a customer enters an item for purchase from the department in the self-service checkout terminal. The method also includes the step of determining if the customer has an additional item for purchase from the department to enter in the self-service checkout terminal in response to generation of the item-entered control signal and generating a no-additional-items control signal if the customer has no additional items from the department to enter in the self-service checkout terminal. The method further includes the step of operating the self-service checkout terminal so as to allow the customer to tender payment for the item for purchase in the department of the department store. Moreover, the method includes the step of operating the supervisor terminal so as to provide security to the purchase transaction of the customer in the exit area of the retail store.

In accordance with a fourth embodiment of the present invention, there is provided a department store retail system for performing a purchase transaction. The retail system includes a first self-service checkout terminal positioned in a first department of said department store. The first self-service checkout terminal is configured to (i) generate a first item-entered control signal if a customer enters a first item for purchase from said first department in said first self-service checkout terminal, (ii) determine if said customer has an additional item for purchase from said first department to enter in said first self-service checkout terminal in response to generation of said first item-entered control signal and generate a first no-additional-items control signal if said customer has no additional items from said first department to enter in said first self-service checkout terminal, and (iii) suspend said purchase transaction of said customer in response to generation of said first no-additional-items control signal. The retail system also includes a second self-service checkout terminal positioned in a second department of said department store. The second self-service checkout terminal is electrically coupled to said first self-service checkout terminal. The second self-service checkout-terminal is configured to (i) resume said purchase transaction of said customer at said second self-service checkout terminal and (ii) generate a second item-entered control signal if said customer enters a second item for purchase from said second department in said second self-service checkout terminal.

It is therefore an object of the present invention to provide a new and useful method and apparatus of operating a self-service retail system.

It is moreover an object of the present invention to provide an improved method and apparatus for operating a self-service retail system.

It is yet further an object of the present invention to provide a method and apparatus for operating a retail system which allows for the performance of a self-service checkout transaction in a department store.

The above and other objects, features, and advantages of the present invention will become apparent from the following description and the attached drawings.

DETAILED DESCRIPTION OF THE INVENTION

Figure 1:
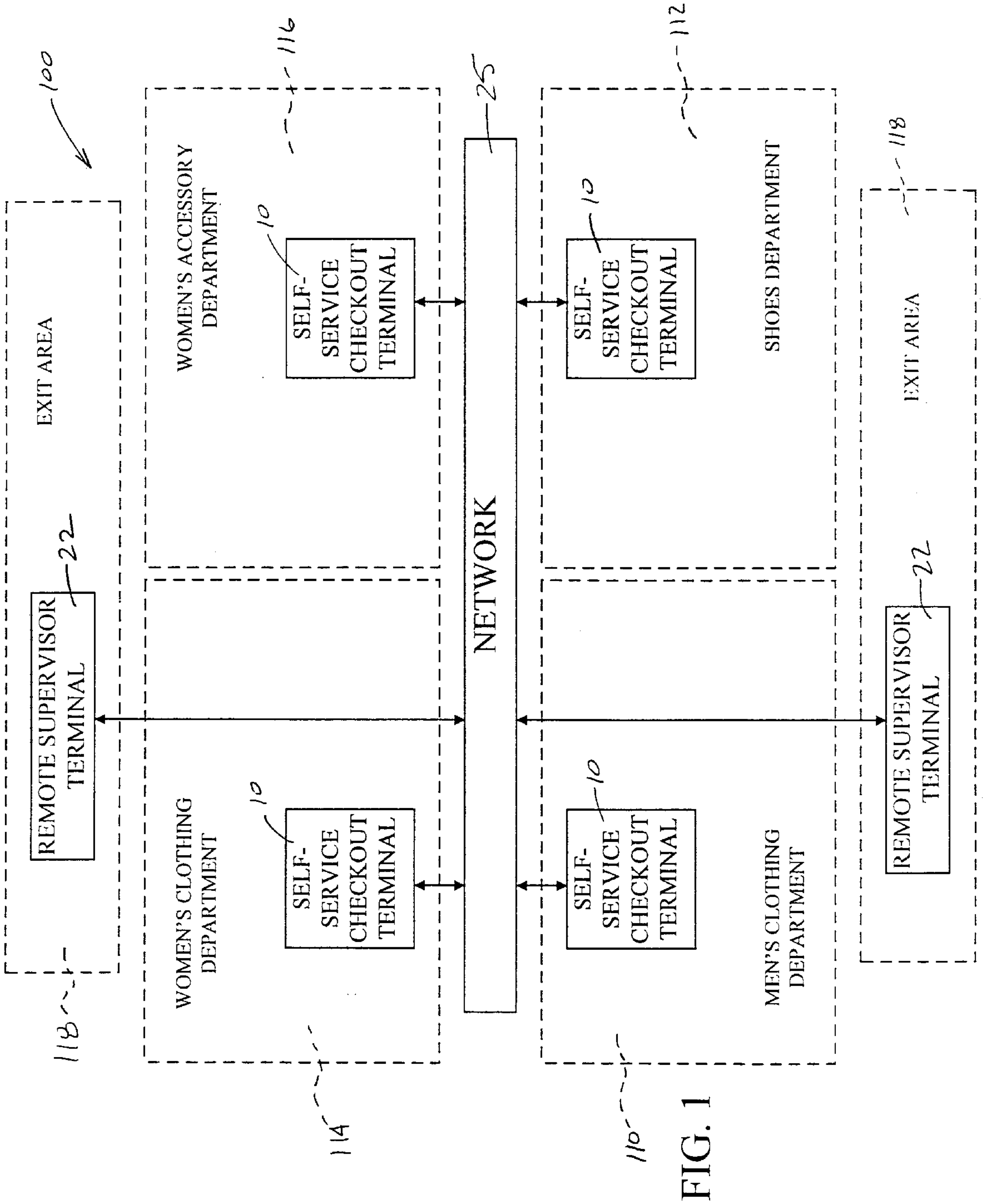
FIG. 1 is a simplified block diagram of a self-service department store retail system which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a self-service retail system 100 for use in a retail business such as a department store. The self-service department store retail system 100 includes a number of self-service checkout terminals 10 and a number of remote supervisor terminals 22. What is meant herein by the term "self-service checkout terminal" is a retail terminal which is operated by a customer to perform a retail transaction without the assistance of store personnel. Each of the self-service checkout terminals 10 is electrically coupled to one another and to each of the remote supervisor terminals 22 via a network 25 such as a LAN or WAN. The self-service checkout terminals 10 communicate with components coupled to the retailer's network 25 such as data servers and the like during a purchase transaction in order to obtain information, such as pricing information, associated with an item being scanned or otherwise entered, and also to verify customer credit approval when appropriate.

As shown in FIG. 1, each of the self-service checkout terminals 10 is located in a separate department of the department store. What is meant herein by the term "department" is an area of the store in which a particular good or types of goods is displayed and sold within a department store arrangement. Examples of departments include a men's clothing department, a shoe department, a lumber department, a home stereo department, etcetera. Hence, in the exemplary arrangement of FIG. 1, a first self-service checkout terminal 10 is located in a men's clothing department 110, a second self-service checkout terminal 10 is located in a shoes department 112, a third self-service checkout terminal 10 is located in a women's clothing department 114, and a fourth self-service checkout terminal 10 is located in a women's accessory department 116. It should be appreciated that the arrangement of the self-service checkout terminals 10 shown in FIG. 1 is exemplary in nature, and that any number and arrangement of the self-service checkout terminals 10 may be utilized to fit the needs of a given department store.

As also shown in FIG. 1, the supervisor terminals 22 are positioned in the various centralized areas of the department store. For example, the supervisor terminals 22 may be positioned in a number of exit areas 118 of the department store. As used herein, the term exit area means the area of the department store proximate to the doors leading into and out of the department store. As shall be discussed below in more detail, such placement of the supervisor terminals 22 allows retail personnel operating the supervisor terminals 22 to provide security during operation of the department store retail system 10.

Figure 2:
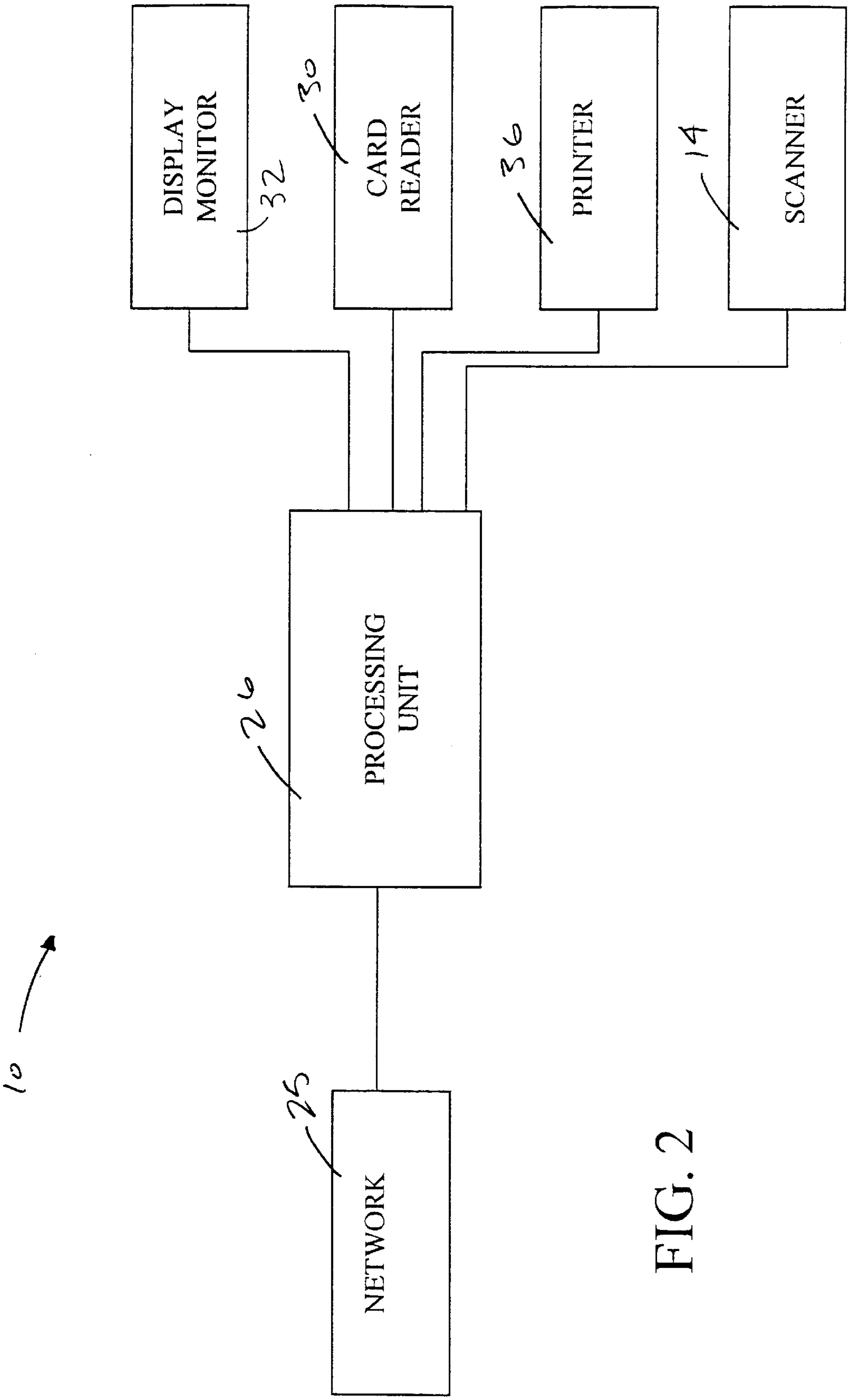
FIG. 2 is a simplified block diagram of one of the self-service checkout terminals of the retail system of FIG. 1.

Referring now to FIG. 2, there is shown a simplified block diagram of one of the self-service checkout terminals 10 of the department store retail system 100. The self-service checkout terminal 10 includes a processing unit 26, a scanner 14, a card reader 30, a display monitor 32, and a printer 36.

The scanner 14 may be provided as a small stationary scanner or may alternatively be configured as a "hand-held" scanner which may be secured within a stationary holder in one mode of operation and freely movable in the form of a scanner "gun" in another mode of operation. In either configuration, the scanner 14 conventionally scans or reads a product identification code such as a Universal Product Code (UPC), industrial symbol(s), alphanumeric character (s), or other indicia associated with an item to be purchased. In particular, the scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is presented to the scanner 14, the scanning light beams scatter off the code and are returned to the scanner 14 where they are collected and detected. The reflected light is then analyzed electronically in order to determine whether the reflected light contains a valid code pattern. If a valid code pattern is present, the product identification code may then be utilized to retrieve product information associated with the item (e.g. the price of the item).

The display monitor 32 displays instructions which serve to guide a customer through a purchase transaction. For example, an instruction is displayed on the display monitor 32 which instructs the customer to enter an item into the self-service checkout terminal 10 by passing or otherwise presenting the bar code associated with the item to the scanner 14. Moreover, as described below in greater detail, an instruction may also be displayed on the display monitor 32 which instructs the customer to approach one of the remote supervisor terminals 22 if the customer desires assistance from the store employee (e.g. a retail clerk) operating the supervisor terminal 22 in order to complete his or her checkout transaction. The display monitor 32 is preferably a known touch screen monitor which can generate data signals when certain areas of the screen are touched by a customer.

The card reader 30 is preferably includes any known magnetic-strip card reader device such as a credit or debit card reader. Moreover, the card reader 30 may also include a known smart card reader. The card reader 30 is provided to allow the customer to tender payment for his or her items for purchase at the self-service checkout terminal 10 by use of a debit, credit, or smart card; however, it should be appreciated that the self-service checkout terminal 10 may optionally be configured without a card reader 30 in order to reduce the cost of each of the self-service checkout terminals 10. In should be appreciated that when the self-service checkout terminal 10 is configured without the card reader 30, customers tender payment for their items for purchase at another retail terminal within the department store such as one of the remote supervisor terminals 22.

The printer 36 is provided to print a record of either a customer's completed or suspended retail purchase transaction. In particular, as shall be discussed below in more detail, a customer may enter an item for purchase into one of the self-service checkout terminals 10, but opt not to tender payment for the item until a later time (e.g. the customer may have additional items to purchase and desires to pay for all of his or her items for purchase at the same time). In such a case, the printer 36 may be utilized to print a temporary receipt which includes a code such as a machine readable bar code which may be utilized to resume the customer's purchase transaction at either another one of the self-service checkout terminals 10 or one of the supervisor terminals 22. However, if the customer actually tenders payment for his or her item(s) for purchase at one of the self-service checkout terminals 10 by, for example, swiping his or her credit card through the card reader 30, the printer 36 may be utilized to print a final receipt which indicates that the customer has properly tendered payment for his or her items for purchase.

Figure 3:
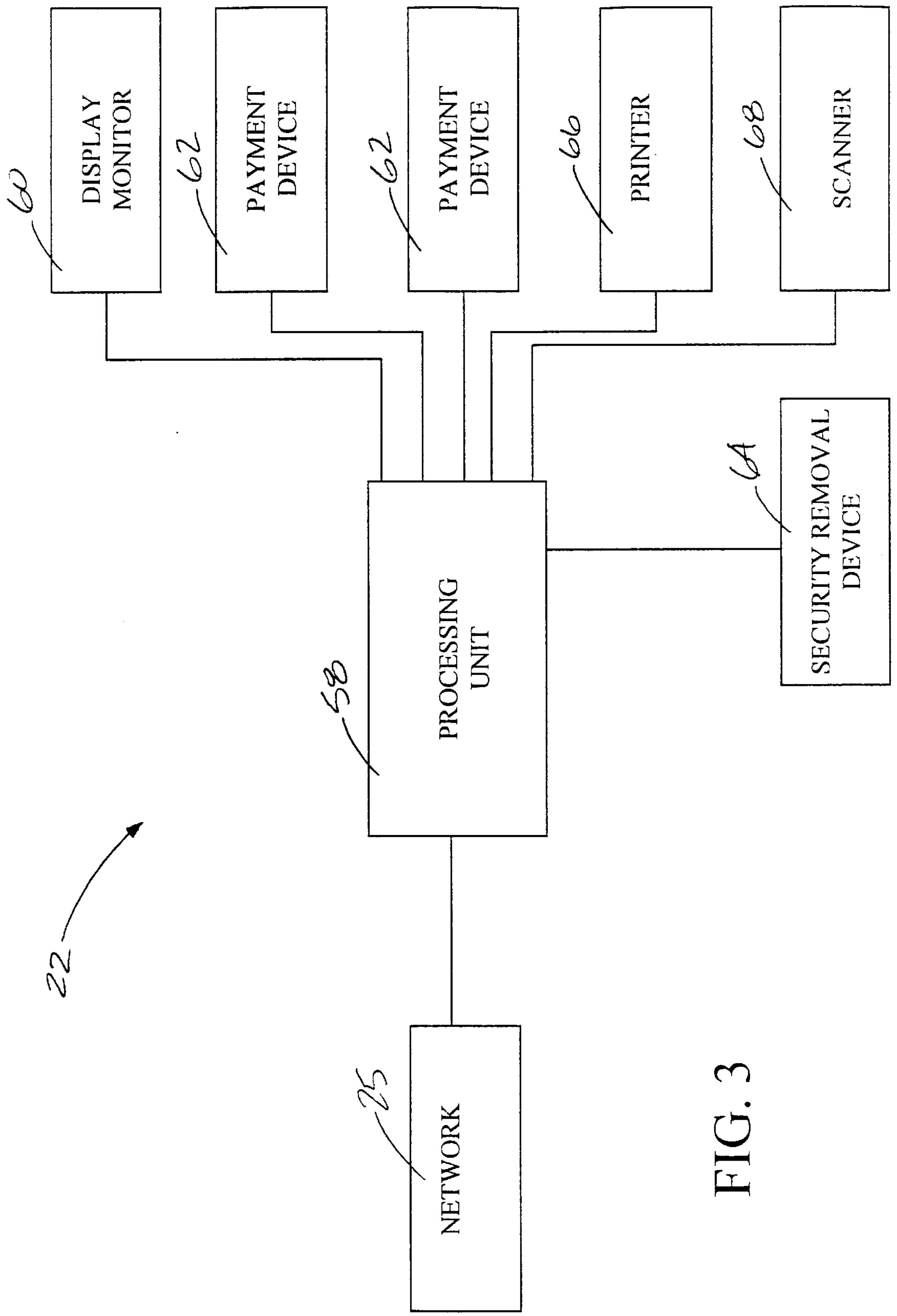
FIG. 3 is a simplified of one of the remote supervisor terminals of the retail system of FIG. 1.

Referring now to FIG. 3, there is shown a simplified block diagram of an exemplary supervisor terminal which may be utilized as the remote supervisor terminals 22 of the present invention. Each of the remote supervisor terminals 22 includes a processing unit 58, a display monitor 60, one or more payment devices 62, a security removal device 64, a printer 66, and a scanner 68.

The display monitor 60 is provided to allow retail personnel (e.g. a retail clerk) operating the supervisor terminal 22 to complete a retail purchase transaction. For example, as discussed below in more detail, the display monitor 60 may be utilized to display the details of a given customer's suspended purchase transaction. Moreover, the display monitor 60 may be utilized to display product information such as description and price along with transaction information such as total amount of the transaction or change amount due the customer in order to allow the retail clerk operating the supervisor terminal 22 to complete the purchase transaction.

The payment devices 62 may include any number of known payment devices. For example, one of the payment devices 62 may be embodied as a known card reader device which allows the retail clerk operating the supervisor terminal 22 to accept payment from the customer in the form of a debit, credit, or smart card. Moreover, one of the payment devices 62 may be embodied as a cash acceptor for accepting cash from the customer. Yet further, one of the payment devices may include a known cash drawer for allowing the retail clerk operating the supervisor terminal 22 to manually accept cash from the customer. Hence, from the above description, it should be appreciated that the payment devices 62 may include any number or types of payment devices which allow a customer to tender payment for his or her items for purchase in a manner which fits the needs of a given department store operation.

The security removal device 64 is provided to remove or otherwise disable a security device which is secured to an item for purchase. In particular, certain of the items for purchase sold by the department store include a security device such as an electronic tag or the like which triggers a security system such as an alarm if the item is taken through the doors of the store without having first disabled the electronic tag. The security removal device 64 is provided to either mechanically or electrically remove the electronic tag so as to prevent the security alarm from being triggered when the customer takes the item out of the department store. It should be appreciated that the security removal device 64 of the present invention may therefore take the form of any mechanical or electrical device which is utilized to disable the alarming function of a given department store's security system in the event an item is taken out of the store.

The printer 66 is provided to print a record of a completed retail purchase transaction. In particular, upon completion of a retail purchase transaction, the printer 66 is utilized to print a receipt which is utilized as a record of the purchase transaction which indicates that the customer properly completed his or transaction and has tendered payment for each of his or items for purchase.

As with the scanner 14, the scanner 68 may be provided as a small stationary scanner or may alternatively be configured as a "hand-held" scanner which may be secured within a stationary holder in one mode of operation and freely movable in the form of a scanner "gun" in another mode of operation. In either configuration, the scanner 68 conventionally scans or reads a product identification code such as a Universal Product Code (UPC), industrial symbol(s), alphanumeric character(s), or other indicia associated with an item to be purchased in order to enter the product identification code into the supervisor terminal 22.

The self-service retail system 100 of the present invention is configured such that a customer may perform a self-service purchase transaction within the department store. For example, a customer may first enter one of the departments of the department store (e.g. the women's clothing department 114) in order to select an item for purchase (e.g. a blouse). Thereafter, the customer may initialize the self-service checkout terminal 10 within the women's clothing department 114 in order to commence a purchase transaction by scanning a bar code printed on a tag secured to the item for purchase (e.g. a tag hanging from the blouse). Once the bar code has been scanned, the price of the item is then displayed on the display monitor 32 along with an instruction which instructs the customer to either (1) enter another item for purchase (if the customer has another item), or (2) complete the customer's purchase transaction within the women's clothing department 114. If the customer desires to complete the purchase transaction within the women's clothing department 114, the customer is given two options. Firstly, the customer may pay for his or her items for purchase (e.g. the blouse) by swiping his or her credit, debit, or smart card through the card reader 30. Alternatively, the customer may opt to pay for his or her item(s) for purchase (e.g. the blouse) at a later time such as in another department after the customer has selected all of his or her remaining items for purchase. In the case of when the customer desires to pay for his or her items for purchase at a later time, the customer touches a particular area of the touch screen associated with the display monitor 32 which indicates that (1) the customer has no additional items from the women's clothing department 114 to enter, and (2) the customer desires to pay for his or her items at a later time. Thereafter, the customer's purchase transaction is suspended and a temporary receipt which has a code which identifies the customer's suspended transaction is printed with the printer 36.

Once the customer's transaction has been suspended at the self-service checkout terminal 10 within the women's clothing department 114, the customer is then free to move to other departments within the department store in order to select additional items for purchase. For example, the customer may opt to select an item for purchase from the women's accessory department 116. In such a situation, the customer selects his or her additional item(s) for purchase (e.g. a belt), and thereafter initializes the self-service checkout terminal 10 located within the women's accessory department 116. In particular, once the customer has selected his or her additional item(s) for purchase (e.g. a belt), the customer scans the machine readable bar code which was printed on the customer's temporary receipt from the women's clothing department 114 with the scanner 14. Entry of the bar code causes the customer's purchase transaction to be resumed thereby allowing the customer to enter additional items for purchase (e.g. the belt). Once each of the customer's additional item(s) have been entered, the customer may opt to either pay for his or her items (including any items from other departments which have not yet been paid for) by use of the card reader 30, or the customer may alternatively choose to pay for his or her items for purchase at a later time thereby causing the customer's transaction to again be suspended in the manner previously discussed.

Prior to exiting the store, the customer finalizes or otherwise completes his or her purchase transaction by advancing to one of the remote supervisor terminals 22. If the customer has items which have not yet been paid for, the customer may hand the retail clerk operating the terminal 22 the customer's temporary receipt thereby allowing the retail clerk to scan the bar code thereon in order to resume the customer's purchase transaction. Once the customer's transaction has been resumed, the retail clerk may then operate the supervisor terminal 22 so as to allow the customer to tender payment for his or her items for purchase by use of the payment devices 62.

Once the customer has tendered payment for his or her items for purchase (either at one of the supervisor terminals 22 or one of the self-service checkout terminals 10), the retail clerk operating the supervisor terminal 22 may operate the security removal device 64 in order to remove the security tags or the like from the customers items for purchase. A final receipt is then printed for the customer with the printer 66 thereby completing the customer's purchase transaction.

Figure 4A:
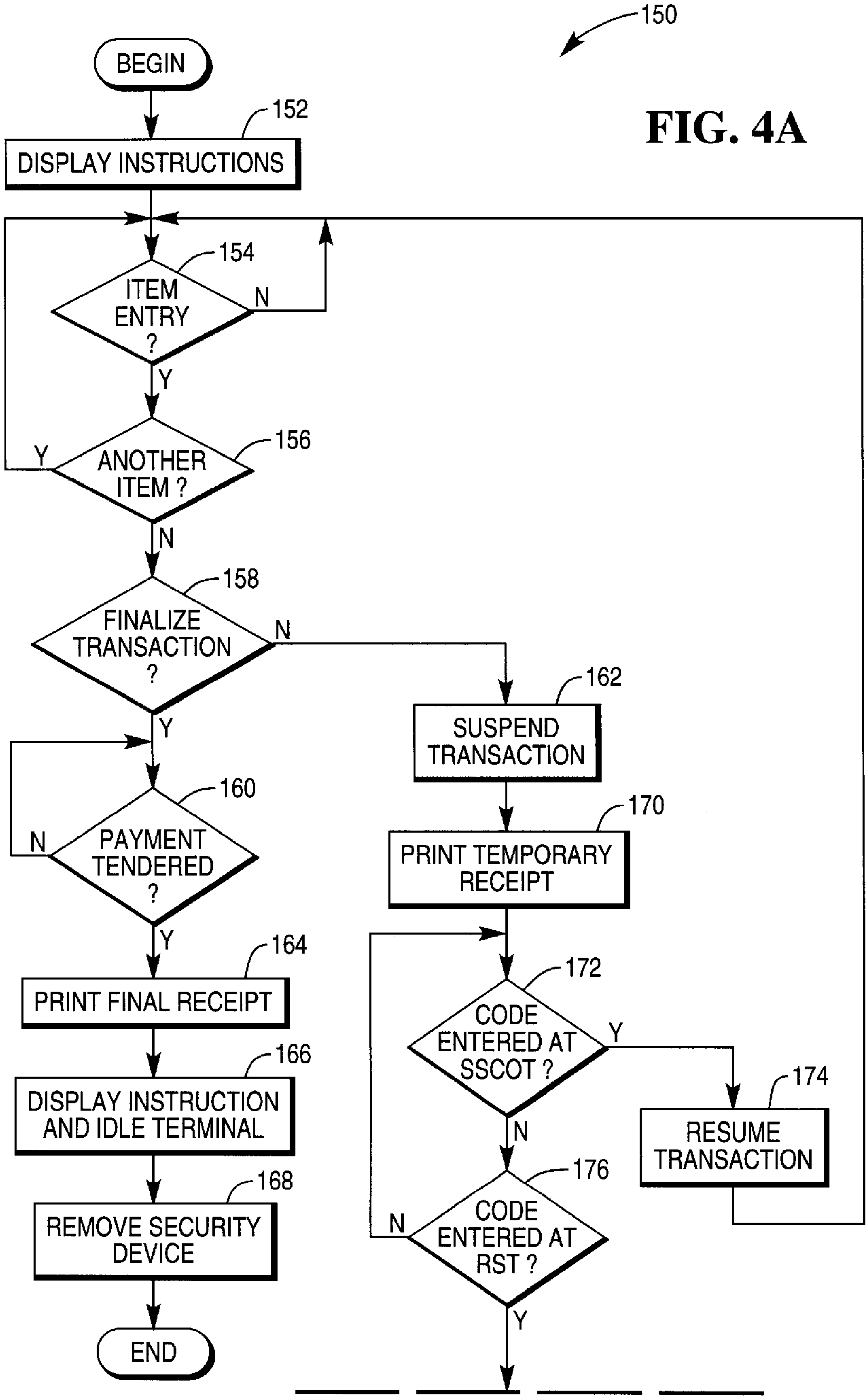
FIGS. 4A and 4B is a flowchart setting forth a general procedure for conducting a purchase transaction with the retail system of FIG. 1.
Figure 4B:
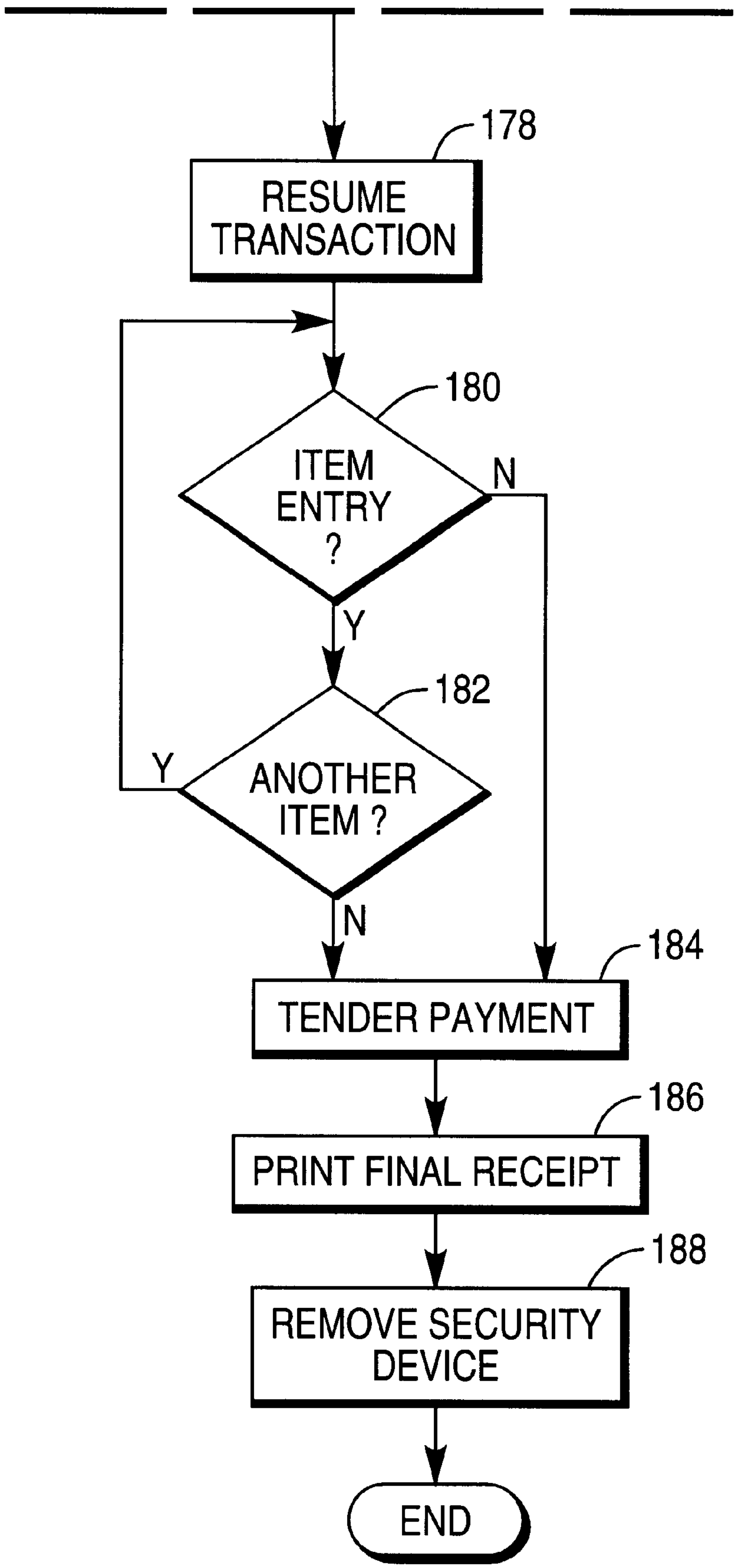

In order to demonstrate the above-described process in more detail, FIG. 4 shows a flowchart which sets forth a general procedure or routine 150 for checking out items with the self-service department store retail system 100. The routine 150 begins with step 152 in which a message is displayed on the display monitor 32 of the self-service checkout terminal 10 which instructs the customer to touch a particular area of the touch screen of the display monitor 32 if the customer has an item for purchase to enter into the self-service checkout terminal 10 located in one of the departments 110, 112, 114, 116. It should be appreciated that when the customer arrives at one of the self-service checkout terminals 10, the terminal 10 is in an idle state. Hence, an initialization procedure is executed prior to checking out items for purchase. In particular, one or more initialization instructions are displayed on the display monitor 32 which instruct the customer to identify himself or herself by inserting a loyalty card, debit card, credit card, or smart card into the card reader 30. The customer may also identify himself or herself by entering a numerical code or his or her name via use of the touch screen associated with the display monitor 32. It should be appreciated that the self-service checkout terminal 10 could also be configured such that the customer is not required to identify himself or herself, but rather is initialized simply by entry of the bar code associated with the customer's first item for purchase.

The routine 150 then advances to step 154 in which the processing unit 26 of the self-service checkout terminal 10 determines whether an item has been entered into the self-service checkout terminal 10. In particular, the processing unit 26 determines if the scanner 14 has successfully read or otherwise captured the product identification code associated with an item. More specifically, the scanner 14 generates an output signal which is sent to the processing unit 26 once the scanner 14 successfully reads the product identification code associated with the item. If an item is successfully entered into the self-service checkout terminal 10, an item-entered control signal is generated and the routine 150 advances to step 156. If an item is not successfully entered into the self-service checkout terminal 10, the item-entered control signal is not generated, and the routine 150 loops back to monitor subsequent entry of an item.

In step 156, the processing unit 26 of the self-service checkout terminal 10 monitors output from the display monitor 32 in order to determine whether there are more items from the department in which the customer is located to be entered. In particular, a message is displayed on the display monitor 32 instructing the customer to touch a particular touch screen area of the display monitor 32 when the customer has completed entering all of his or her items for purchase from the department which the customer is located.

If a particular output is detected from the display monitor 32, the processing unit 26 determines that the customer has no additional to enter from the department in which the customer is located, a no-additional-items control signal is generated and the routine 150 advances to step 158. If a particular output is not detected from the display monitor 32, the processing unit 26 determines that the customer has additional items for purchase to be entered from the department in which the customer is located, and the routine 150 loops back to step 154 to monitor entry of subsequent items.

In step 158, the processing unit 26 of the self-service checkout terminal 10 monitors output from the display monitor 32 in order to determine whether the customer desires to finalize or otherwise complete his or her purchase transaction within the department in which the customer is located. In particular, as described above, the customer may pay for his or her items for purchase by swiping his or her credit, debit, or smart card through the card reader 30. Alternatively, the customer may opt to pay for his or her items for purchase at a later time (e.g. in another department after the customer has selected all of his or her items for purchase). Hence, in step 158, a message is displayed on the display monitor 32 instructing the customer to touch a first particular touch screen area of the display monitor 32 if the customer desires to pay for his or her items for purchase at the self-service checkout terminal 10, or alternatively, touch a second, different particular touch screen area of the display monitor 32 if the customer desires to pay for his or her items for purchase at a later time. If the customer touches the first particular touch screen area of the display monitor 32 thereby indicating that the customer desires to pay for his or her items for purchase at the self-service checkout terminal 10, a pay-now control signal is generated, and the routine 150 advances to step 160. If the customer touches the second particular touch screen area of the display monitor 32 thereby indicating that the customer desires to pay for his or her items for purchase at a later time, a pay-later control signal is generated, and the routine advances to step 162.

In step 160, the processing unit 26 of the self-service checkout terminal 10 determines if the customer has tendered payment for his or her items for purchase. In particular, once the customer has tendered payment for his or her items for purchase by inserting his or her credit, debit, or smart card into the smart card reader 30, the processing unit 26 communicates with the network 25 in order to obtain approval for acceptance of the customer's card. Thereafter, if the customer's card is approved, a payment-tendered control signal is generated and the routine 150 advances to step 164. If the customer has not yet tendered payment for his or her items for purchase by inserting his or her card into the card reader 30, or approval for acceptance of the customer's card has not yet been obtained, the routine 150 loops back to step 160 to monitor for subsequent payment.

In step 164, the processing unit 26 operates the printer 36 so as to generate a final receipt for the customer. It should be appreciated that the final receipt includes, for example, an itemized list of the customer's items for purchase along with a total dollar amount of the customer's items for purchase. Thereafter, the routine 150 advances to step 166.

In step 166, a message is displayed on the display monitor 32 of the self-service checkout terminal 10 which instructs the customer to take his or her items for purchase, along with his or her final receipt, and advance to one of the remote supervisor terminals 22 located near one of the store exit areas 118. Thereafter, the self-service checkout terminal 10 is placed in an idle state until initialized by a subsequent customer. The routine then advances to step 168.

In step 168, the retail clerk operating the remote supervisor terminal 22 operates the terminal so as to provide security from improprieties such as theft. In particular, the retail clerk may visually or otherwise audit the customer's purchase transaction prior to allowing the customer to exit the department store. Moreover, in the case of when one or more of the customer's items for purchase are equipped with a security device such as a electronic security tag or the like, the retail clerk removes the security tag. In particular, as discussed above, certain of the items for purchase sold by the department store include a security device such as an electronic tag or the like which triggers a security system such as an alarm if the item is taken through the doors of the store without having first disabled the electronic tag. The security removal device 64 is provided to either mechanically or electrically remove the electronic tag so as to prevent the security alarm from being triggered when the customer takes the item out of the department store. Therefore, in step 168, once the customer shows the retail clerk a valid final receipt (i.e. the final receipt printed by the printer 36 in step 164), the retail clerk operates the security removal device 64 so as to remove the security tags from the customer's items for purchase, thereby allowing the customer to exit the store without triggering the store's security alarm. Once the security tags have been removed, the routine 150 then ends thereby completing the customer's purchase transaction.

Returning now to step 158, if the customer touches the second particular touch screen area of the display monitor 32 thereby indicating that the customer desires to pay for his or her items for purchase at a later time, a pay-later control signal is generated, and the routine advances to step 162.

In step 162, the customer's purchase transaction is suspended. In particular, the self-service checkout terminal 10 is operated such that the customer is prevented from performing any further operations therewith. For example, the customer is prevented from entering additional items in the terminal 10, using a credit card, or any other operation associated with his or her purchase transaction. It should be appreciated that such suspension of the customer's checkout transaction places the self-service checkout terminal 10 in its idle state thereby rendering the terminal 10 ready to commence a subsequent customer's purchase transaction. The routine 150 then advances to step 170.

In step 170, the processing unit 26 associated with the self-service checkout terminal 10 causes a temporary receipt to be printed with the printer 36. In particular, a temporary receipt is printed which includes a bar code or other type of machine readable code which corresponds to an electronic file stored on a server (not shown) or the like of the retailer's network 25. Such an electronic file includes the retail data (e.g. an itemized list of entered items, etcetera) of the customer's suspended purchase transaction. Thereafter, the routine 150 advances to step 172.

In step 172, the processing unit 26 associated with one of the self-service checkout terminals 10 determines if the customer has approached the self-service checkout terminal 10. In particular, once the customer approaches one of the self-service checkout terminals 10 located within one of the departments 110, 112, 114, 116 and thereafter scans the bar code printed on the customer's temporary receipt, the processing unit 26 of the self-service checkout terminal 10 concludes that the customer is initializing the terminal 10 in order to purchase additional items or otherwise continue the customer's purchase transaction. Hence, in step 172, if the bar code is read from the customer's temporary receipt by the scanner 14 of one of the self-service checkout terminals 10, the routine 150 advances to step 174. If the bar code is not read from the customer's temporary receipt by the scanner 14 of one of the self-service checkout terminals 10, the routine 150 advances to step 176.

In step 174, the self-service checkout terminal 10 resumes the customer's purchase transaction. In particular, the successful reading of the bar code from the customer's temporary receipt causes the electronic file associated with the customer's purchase transaction to be retrieved from the server (not shown) of the retailer's network 25 such that the customer may resume the customer's purchase transaction at the initialized self-service checkout terminals 10. During such resumption of the customer's purchase transaction, the customer may scan or otherwise enter additional items for purchase from the department in which the self-service checkout terminal 10 is being operated by the customer and/or tender payment for any items for purchase which have not yet been paid or by inserting his or her debit, credit, or smart card into the card reader 30. Once the customer's purchase transaction has been resumed, the routine 150 loops back to step 154 to monitor subsequent item entry and/or tendering of payment.

Referring back to step 172, if the customer does not resume his or her purchase transaction at one of the self-service checkout terminals 10, the routine 150 advances to step 176. In step 176, the processing unit 58 associated with one of the remote supervisor terminals 22 determines if the customer has approached the remote supervisor terminal 22. In particular, once the customer approaches one of the remote supervisor terminals 22 and thereafter gives his or her temporary receipt to the retail clerk operating the remote supervisor terminal 22, the clerk operates the scanner 68 so as to read the bar code printed on the customer's temporary receipt. Hence, in step 176, if the bar code is read from the customer's temporary receipt by the scanner 68 of one of the remote supervisor terminals 22, the routine 150 advances to step 178. If the bar code is not read from the customer's temporary receipt by the scanner 68 of one of the remote supervisor terminals 22, the routine 150 loops back to step 172 to monitor subsequent resumption of the customer's purchase transaction.

In step 178, the remote supervisor terminal 22 resumes the customer's purchase transaction. In particular, the successful reading of the bar code from the customer's temporary receipt causes the electronic file associated with the customer's purchase transaction to be retrieved from the server (not shown) of the retailer's network 25 such that the retail clerk operating the remote supervisor terminal 22 may resume the customer's purchase transaction at the remote supervisor terminal 22. As shall be discussed below, during such resumption of the customer's purchase transaction, the retail clerk operating the remote supervisor terminal 22 may (1) scan with the scanner 68 or otherwise enter any additional items for purchase which have not been previously scanned into one the self-service checkout terminals 10 by the customer, (2) operate the payment devices 62 so as to allow the customer to tender payment for his or her items for purchase, and (3) provide security to the customer's purchase transaction by, for example, removing security tags from the customer's items for purchase with the security removal device 64 . Once the customer's purchase transaction has been resumed at one of the remote supervisor terminals 22, the routine 150 advances to step 180.

In step 180, the processing unit 58 of the remote supervisor terminal 22 determines whether an item has been entered into the terminal 22. In particular, the processing unit 58 determines if the scanner 68 has successfully read or otherwise captured the product identification code associated with an item. More specifically, the scanner 68 generates an output signal which is sent to the processing unit 58 once the scanner 68 successfully reads the product identification code associated with the item. If an item is successfully entered into the remote supervisor terminal 22, an item-entered control signal is generated and the routine 150 advances to step 182. If an item is not successfully entered into the remote supervisor terminal 22, the item-entered control signal is not generated, and the routine 150 advances to step 184.

In step 182, the processing unit 58 of the remote supervisor terminal 22 monitors output from the display monitor 60 in order to determine whether there are more items to be entered. In particular, the retail clerk operating the remote supervisor terminal 22 touches a particular touch screen area of the display monitor 60 when the retail clerk has completed entering all of the customer's remaining items for purchase. Hence, in step 182, if the retail clerk touches the particular area of the touch screen associated with the display monitor 60 thereby indicating that the clerk has entered all of the customer's items for purchase, the routine 150 advances to step 184. If the retail clerk does not touch the particular area of the touch screen associated with the display monitor 60, to routine 150 loops back to step 180 to monitor subsequent item entry.

In step 184, the customer is allowed to tender payment for his or her items for purchase. In particular, the retail clerk operates the payment devices 62 so as to allow the customer to tender payment for any items which the customer did not tender payment for at one of the self-service checkout terminals 10. For example, in the case of when one of the payment devices 62 is embodied as a card reader, the customer is allowed to tender payment for his or her items for purchase by use of a credit, debit, or smart card. Moreover, in the case of when one of the payment devices 62 is embodied as a cash acceptor, the customer is allowed to insert cash into the cash acceptor in order to tender payment for his or her items for purchase. Yet further, in the case of when one of the payment devices 62 is embodied as a cash drawer, the customer hands cash to the retail clerk operating the remote supervisor terminal 22 for placement in the cash drawer in order to tender payment for his or her items for purchase. Once the customer has tendered payment for his or her items for purchase, the routine 150 advances to step 186.

In step 186, the processing unit 58 of the remote supervisor terminal 22 operates the printer 66 so as to generate a final receipt for the customer. It should be appreciated that the final receipt includes, for example, an itemized list of the customer's items for purchase along with a total dollar amount of the customer's items for purchase. Thereafter, the routine 150 advances to step 188.

In step 188, the retail clerk operating the remote supervisor terminal 22 operates the terminal so as to provide security from improprieties such as theft. In particular, the retail clerk may visually or otherwise audit the customer's purchase transaction prior to allowing the customer to exit the department store. Moreover, in the case of where one or more of the customer's items for purchase are equipped with a security device such as a electronic security tag or the like, the retail clerk removes the security tag. In particular, as discussed above, certain of the items for purchase sold by the department store include a security device such as an electronic tag or the like which triggers a security system such as an alarm if the item is taken through the doors of the store without having first disabled the electronic tag. The security removal device 64 is provided to either mechanically or electrically remove the electronic tag so as to prevent the security alarm from being triggered when the customer takes the item out of the department store. Therefore, in step 188, the retail clerk operates the security removal device 64 so as to remove the security tags from the customer's items for purchase thereby allowing the customer to exit the store without triggering the store's security alarm. Once the security tags have been removed, the routine 150 then ends thereby completing the customer's purchase transaction.

As described above, the self-service department store retail system 100 of the present invention provides numerous advantages over retail systems which have heretofore been designed. For example, by providing a process by which customers may perform and in some cases complete a self-service checkout transaction within a department store setting, the number of employees needed by the retailer to run the retailer's department store is reduced thereby reducing costs associated with the retailer's operation. Moreover, use of the remote supervisor terminals 22 in the manner previously described provides security from improprieties such as theft.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

There are a plurality of advantages of the present invention arising from the various features of the retail system described herein. It will be noted that alternative embodiments of the retail system of the present invention may not include all of the features described yet still benefit from at least some of the advantages of such features. Those of ordinary skill in the art may readily devise their own implementations of a retail system that incorporate one or more of the features of the present invention and fall within the spirit and scope of the present invention as defined by the appended claims.

What is claimed is:

1. A method of operating a department store retail system in order to perform a purchase transaction, with said department store retail system having (i) a first self-service checkout terminal positioned in a first department of said department store, and (ii) a supervisor terminal, comprising the steps of:

generating a first item-entered control signal if a customer enters a first item for purchase from said first department in said first self-service checkout terminal;

determining if said customer has an additional item for purchase from said first department to enter in said first self-service checkout terminal in response to generation of said first item-entered control signal and generating a first no-additional-items control signal if said customer has no additional items from said first department to enter in said first self-service checkout terminal; and suspending said purchase transaction of said customer at said first self-service checkout terminal in response to generation of said first no-additional-items control signal.

2. The method of claim 1, further comprising the step of resuming said purchase transaction of said customer at said supervisor terminal, wherein said resuming step is performed subsequent to said suspending step.

3. The method of claim 2, wherein said resuming step includes the step of operating said supervisor terminal so as to allow said customer to tender payment for said first item for purchase.

4. The method of claim 3, wherein:

said supervisor terminal is positioned in an exit area of said department store, and said exit area of said department store is distinct from said first department of said department store.

5. The method of claim 2, wherein said step of suspending said purchase transaction of said customer at said first self-service checkout terminal includes the step of printing a receipt with a printer which is associated with said first self-service checkout terminal.

6. The method of claim 5, wherein:

said step of printing said receipt includes the step of printing a machine readable code on said receipt, and said resuming step includes the step of entering said machine readable code from said receipt at said supervisor terminal.

7. The method of claim 1, wherein said department store retail system further includes a second self-service checkout terminal which is positioned in a second department of said department store, further comprising the steps of:

resuming said purchase transaction of said customer at said second self-service checkout terminal, wherein said resuming step is performed subsequent to said suspending step;

generating a second item-entered control signal if said customer enters a second item for purchase from said second department in said second self-service checkout terminal;

determining if said customer has an additional item for purchase from said second department to enter in said second self-service checkout terminal in response to generation of said second item-entered control signal and generating a second no-additional-items control signal if said customer has no additional items from said second department to enter in said second self-service checkout terminal; and suspending said purchase transaction of said customer at said second self-service checkout terminal in response to generation of said second no-additional-items control signal.

8. The method of claim 7, further comprising the step of resuming aid purchase transaction of said customer at said supervisor terminal, herein said step of resuming said purchase transaction of said customer at said supervisor terminal is performed subsequent to said step of suspending said purchase transaction of said customer at said second self-service checkout terminal.

9. The method of claim 8, wherein said step of resuming said purchase transaction of said customer at said supervisor terminal includes the step of operating said supervisor terminal so as to allow said customer to tender payment for said first item for purchase and said second item for purchase.

10. The method of claim 9, wherein:

said supervisor terminal is positioned in an exit area of said department store, and said exit area of said department store is distinct from both said first department and said second department of said department store.

11. A method of operating a department store retail system in order to perform a purchase transaction, with said department store retail system having (i) a first self-service checkout terminal positioned in a first department of said department store, and (ii) a second self-service checkout terminal positioned in a second department of said department store, comprising the steps of:

generating a first item-entered control signal if a customer enters a first item for purchase from said first department in said first self-service checkout terminal;

determining if said customer has an additional item for purchase from said first department to enter in said first self-service checkout terminal in response to generation of said first item-entered control signal and generating a first no-additional-items control signal if said customer has no additional items from said first department to enter in said first self-service checkout terminal;

suspending said purchase transaction of said customer at said first self-service checkout terminal in response to generation of said first no-additional-items control signal;

resuming said purchase transaction of said customer at said second self-service checkout terminal, wherein said resuming step is performed subsequent to said suspending step; and generating a second item-entered control signal if said customer enters a second item for purchase from said second department in said second self-service checkout terminal.

12. The method of claim 11, further comprising the steps of:

determining if said customer has an additional item for purchase from said second department to enter in said second self-service checkout terminal in response to generation of said second item-entered control signal and generating a second no-additional-items control signal if said customer has no additional items from said second department to enter in said second self-service checkout terminal; and suspending said purchase transaction of said customer at said second self-service checkout terminal in response to generation of said second no-additional-items control signal.

13. The method of claim 11, further comprising the steps of:

determining if said customer has an additional item for purchase from said second department to enter in said second self-service checkout terminal in response to generation of said second item-entered control signal and generating a second no-additional-items control signal if said customer has no additional items from said second department to enter in said second self-service checkout terminal; and operating said second self-service checkout terminal so as to allow said customer to tender payment for said first item for purchase and said second item for purchase in response to generation of said second no-additional-items control signal.

14. The method of claim 11, wherein said step of suspending said purchase transaction of said customer at said first self-service checkout terminal includes the step of printing a receipt with a printer which is associated with said first self-service checkout terminal.

15. The method of claim 14, wherein:

said step of printing said receipt includes the step of printing a machine readable code on said receipt, and said resuming step includes the step of entering said machine readable code from said receipt at said second self-service checkout terminal.

16. A method of operating a department store retail system in order to perform a purchase transaction, with said department store retail system having (i) a self-service checkout terminal positioned in a department of said department store, and (ii) a supervisor terminal positioned in an exit area of said department store, comprising the steps of:

generating an item-entered control signal if a customer enters an item for purchase from said department in said self-service checkout terminal;

determining if said customer has an additional item for purchase from said department to enter in said self-service checkout terminal in response to generation of said item-entered control signal and generating a no-additional-items control signal if said customer has no additional items from said department to enter in said self-service checkout terminal;

operating said self-service checkout terminal so as to allow said customer to tender payment for said item for purchase in said department of said department store; and operating said supervisor terminal so as to provide security to said purchase transaction of said customer in said exit area of said retail store.

17. The method of claim 16, wherein:

said item for purchase from said department has a security device secured thereto, and said step of operating said supervisor terminal so as to provide security to said purchase transaction of said customer in said exit area of said retail store includes the step of operating a removal device associated with said supervisor terminal so as to remove said security device from said item for purchase.

18. The method of claim 16, wherein:

said step of operating said self-service checkout terminal so as to allow said customer to tender payment for said item for purchase includes the step of printing a receipt with a printer associated with said self-service checkout terminal, said step of printing said receipt includes the step of printing a machine readable code on said receipt, and said step of operating said supervisor terminal so as to provide security to said purchase transaction of said customer in said exit area of said retail store includes the step of entering said machine readable code from said receipt at said supervisor terminal.

19. A department store retail system for performing a purchase transaction, comprising:

a first self-service checkout terminal positioned in a first department of said department store, wherein said first self-service checkout terminal is configured to (i) generate a first item-entered control signal if a customer enters a first item for purchase from said first department in said first self-service checkout terminal, (ii) determine if said customer has an additional item for purchase from said first department to enter in said first self-service checkout terminal in response to generation of said first item-entered control signal and generate a first no-additional-items control signal if said customer has no additional items from said first department to enter in said first self-service checkout terminal, and (iii) suspend said purchase transaction of said customer in response to generation of said first no-additional-items control signal; and a second self-service checkout terminal positioned in a second department of said department store, said second self-service checkout terminal being electrically coupled to said first self-service checkout terminal, wherein said second self-service checkout terminal is configured to (i) resume said purchase transaction of said customer at said second self-service checkout terminal, and (ii) generate a second item-entered control signal if said customer enters a second item for purchase from said second department in said second self-service checkout terminal.

20. The department store retail system of claim 19, wherein said second self-service checkout terminal is further configured to:

determine if said customer has an additional item for purchase from said second department to enter in said second self-service checkout terminal in response to generation of said second item-entered control signal and generate a second no-additional-items control signal if said customer has no additional items from said second department to enter in said second self-service checkout terminal, and suspend said purchase transaction of said customer at said second self-service checkout terminal in response to generation of said second no-additional-items control signal.

21. The department store retail system of claim 19, wherein said second self-service checkout terminal is further configured to:

determine if said customer has an additional item for purchase from said second department to enter in said second self-service checkout terminal in response to generation of said second item-entered control signal and generate a second no-additional-items control signal if said customer has no additional items from said second department to enter in said second self-service checkout terminal, and operate a payment device associated with said second self-service checkout terminal so as to allow said customer to tender payment for said first item for purchase and said second item for purchase in response to generation of said second no-additional-items control signal.

22. A method of operating a department store retail system in order to perform a purchase transaction, with said department store retail system having (i) a first self-service checkout terminal positioned in a first department of a department store, and (ii) a supervisor terminal, comprising the steps of:

generating a first item-entered control signal if a customer enters a first item for purchase in said first self-service checkout terminal;

determining if said customer desires to tender payment for said first item at said first self-service checkout terminal in response to generation of said first item-entered control signal, said determining step including (i) generating a first pay-now control signal if said customer operates said self-service checkout terminal to indicate a desire to tender payment for said first item at said first self-service checkout terminal, and (ii) generating a first pay-later control signal if said customer operates said self-service checkout terminal to indicate a desire no to tender payment for said first item at said first self-service checkout terminal;

operating said first self-service checkout terminal to allow said customer to tender payment for said first item for purchase in response to generation of said first pay-now control signal; and suspending operation of said purchase transaction in response to generation of said first pay-later control signal.

23. The method of claim 22, further comprising the step of resuming said purchase transaction of said customer at said supervisory terminal.

24. The method of claim 23, wherein said resuming step includes the step of operating said supervisory terminal to allow said customer to tender payment for said first item for purchase at said supervisor terminal.

25. The method of claim 23, wherein said step of suspending said purchase transaction of said customer at said first self-service checkout terminal includes the step of printing a receipt with a printer which is associated with said first self-service checkout terminal.

26. The method of claim 25, wherein:

said step of printing said receipt includes the step of printing a machine readable code on said receipt, and said resuming step includes the step of entering said machine readable code from said receipt at said supervisor terminal.

27. The method of claim 22, wherein:

said supervisor terminal is positioned in an exit area of said department store, and said exit area of said department store is distinct from said first department of said department store.

28. The method of claim 22, wherein:

said department store retail system further has a second self-service checkout terminal positioned in a second department of said department store, and said resuming step includes the steps of:

(a) generating a second item-entered control signal if said customer enters a second item for purchase in said second self-service checkout terminal;

(b) determining if said customer desires to tender payment for said second item at said second self-service checkout terminal in response to generation of said second item-entered control signal, said determining step including (i) generating a second pay-now control signal if said customer operates said self-service checkout terminal to indicate a desire to tender payment for said second item at said second self-service checkout terminal, and (ii) generating a second pay-later control signal if said customer operates said self-service checkout terminal to indicate a desire not to tender payment for said second item at said second self-service checkout terminal;

(c) operating said second self-service checkout terminal to allow said customer to tender payment for said second item for purchase in response to generation of said second pay-now control signal; and (d) suspending operation of said purchase transaction in response to generation of said second pay-later control signal.

29. The method of claim 28, further comprising the step of resuming said purchase transaction of said customer at said supervisory terminal.

30. The method of claim 29, wherein said supervisory terminal resuming step includes the step of operating said supervisory terminal to allow said customer to tender payment for both (i) said first item for purchase, and (ii) said second item for purchase.

31. The method of claim 22, wherein:

said supervisor terminal is positioned in an exit area of said department store, and said exit area of said department store is distinct from both said first department and said second department.

32. The method of claim 22, wherein said department store retail system further has a second self-service checkout terminal positioned in a second department of said department store, further comprising the step of:

resuming said purchase transaction of said customer at said second self-service checkout terminal.

33. The method of claim 32, wherein said resuming step includes the step of operating said second self-service checkout terminal to allow said customer to tender payment for said first item for purchase at said second self-service checkout terminal.

34. A method of operating a department store retail system in order to perform a purchase transaction, with said department store retail system having (i) a first self-service checkout terminal positioned in a first department of a department store, and (ii) a second self-service checkout terminal positioned in a second department of said department store which is distinct from said first department, comprising the steps of:

generating a first item-entered control signal if a customer enters a first item for purchase in said first self-service checkout terminal;

determining if said customer desires to tender payment for said first item at said first self-service checkout terminal in response to generation of said first item-entered control signal, said determining step including (i) generating a first pay-now control signal if said customer operates said self-service checkout terminal to indicate a desire to tender payment for said first item at said first self-service checkout terminal, and (ii) generating a first pay-later control signal if said customer operates said self-service checkout terminal to indicate a desire not to tender payment for said first item at said first self-service checkout terminal;

operating said first self-service checkout terminal to allow said customer to tender payment for said first item for purchase in response to generation of said first pay-now control signal; and suspending operation of said purchase transaction in response to generation of said first pay-later control signal.

35. The method of claim 34, further comprising the step of resuming said purchase transaction of said customer at said second self-service checkout terminal.

36. The method of claim 35, wherein said resuming step includes the step of operating said second self-service checkout terminal to allow said customer to tender payment for said first item for purchase at said second self-service checkout terminal.

* * * * *

UNITED STATES PATENT AND TRADEMARK OFFICE

CERTIFICATE OF CORRECTION

PATENT NO. : 6,386,448 B1
DATED : May 14, 2002
INVENTOR(S) : Addy, J.

It is certified that error appears in the above-identified patent and that said Letters Patent is hereby corrected as shown below:

Column 15,
Line 14, after "resuming" delete "aid" and insert -- said --.
Line 15, delete "herein" and insert -- wherein --.

Column 18,
Line 29, delete "no" and insert -- not --.

Signed and Sealed this

Twenty-third Day of July, 2002

*Attest:*

JAMES E. ROGAN

*Attesting Officer*

*Director of the United States Patent and Trademark Office*